United States Patent
Fang et al.

(10) Patent No.: US 7,515,611 B2
(45) Date of Patent: Apr. 7, 2009

(54) UNIFIED DATA PACKET FOR ENCAPSULATING DATA PACKETS HAVING DIVERSE FORMATS

(75) Inventors: Rong C. Fang, Oak Hill, VA (US); Paramjit S. Labana, Herndon, VA (US); David John Tozer, Leesburg, VA (US); Joseph M. Cordani, Hamilton, VA (US); James J. Wisniewski, Bristow, VA (US); Christopher D. Roller, Fairfax, VA (US)

(73) Assignee: Tellabs Reston, Inc., Reston, VA (US)

( * ) Notice: Subject to any disclaimer, the term of this patent is extended or adjusted under 35 U.S.C. 154(b) by 818 days.

(21) Appl. No.: 09/935,780

(22) Filed: Aug. 24, 2001

(65) Prior Publication Data

US 2002/0051465 A1    May 2, 2002

Related U.S. Application Data

(60) Provisional application No. 60/227,477, filed on Aug. 24, 2000.

(51) Int. Cl.
*H04J 3/24* (2006.01)
(52) U.S. Cl. .................. 370/474; 370/392
(58) Field of Classification Search .......... 370/470, 370/471, 474, 475, 476, 392, 394, 395.1, 370/395.6, 395.63, 395.64, 395.65, 472, 370/465, 466, 469, 389
See application file for complete search history.

(56) References Cited

U.S. PATENT DOCUMENTS

| | | | | |
|---|---|---|---|---|
| 5,136,584 A | * | 8/1992 | Hedlund | 370/399 |
| 5,206,858 A | * | 4/1993 | Nakano et al. | 370/465 |
| 5,280,476 A | * | 1/1994 | Kojima et al. | 370/397 |
| 5,369,649 A | * | 11/1994 | Murayama et al. | 714/781 |
| 5,414,702 A | * | 5/1995 | Kudoh | 370/395.7 |
| 5,446,726 A | * | 8/1995 | Rostoker et al. | 370/232 |
| 5,467,342 A | * | 11/1995 | Logston et al. | 370/253 |
| 5,668,812 A | * | 9/1997 | Akiyoshi | 370/474 |
| 5,673,265 A | * | 9/1997 | Gupta et al. | 370/432 |
| 5,796,734 A | * | 8/1998 | Izawa et al. | 370/394 |
| 5,822,321 A | * | 10/1998 | Petersen et al. | 370/474 |

(Continued)

OTHER PUBLICATIONS

Breyer, Robert et al., "Switched, Fast, and Gigabit Ethernet," p. 178-181, 436 and 437 (1999).

(Continued)

*Primary Examiner*—Chi H. Pham
*Assistant Examiner*—Kevin Mew
(74) *Attorney, Agent, or Firm*—Hamilton, Brook, Smith & Reynolds, P.C.

(57) ABSTRACT

Embodiments of the present invention described and shown in the specification and drawings facilitate the transportation of data packets having diverse formats through a general packet switching system. Due to the diverse formats of the data packets used by various common communications protocols, it is has been difficult to produce general packet switching systems that are able to switch multiple protocols. Embodiments of the present invention provide a Unified Data Packet for encapsulating data packets having diverse formats. Through encapsulation, embodiments of the present invention improve switching system efficiency by providing a single data packet format for handling by the switching system while enabling data packets in diverse formats to pass through the switch.

20 Claims, 6 Drawing Sheets

FAIRFAX HEADER 205

| VER | MCST | FPCV | ST[1:0] | SN[2:0] | VERSION 301, MULTICAST 302, FINAL PAYLOAD COUNT VALID 303 SEGMENT TYPE 304, SEQUENCE NUMBER 305 |
|---|---|---|---|---|---|
| RESERVED[7:0] | | | | | RESERVED 306 |
| FRID[15:8] | | | | | FAIRFAX ROUTING ID (MSB) 307 |
| FRID[7:0] | | | | | FAIRFAX ROUTING ID (LSB) 308 |
| SSID[1:0] | | | | SPID[4:2] | SOURCE SLOT ID 309, SOURCE PORT ID (MSB) 310 |
| SPID[1:0] | DP | RESERVED[2:0] | BTAG | FTAG | SOURCE PORT ID (LSB) 311, DISCARD PRIORITY 312, RESERVED 313, BACKWARD TAGGING 314, FORWARD TAGGING 315 |
| FSID[7:0] | | | | | FAIRFAX SERVICE ID (LSB) 316 |
| FQID[7:0] | | | | | FAIRFAX QUEUE ID (LSB) 317 |

FAIRFAX HEADER

U.S. PATENT DOCUMENTS

| | | | |
|---|---|---|---|
| 5,917,828 A * | 6/1999 | Thompson | 370/474 |
| 5,953,322 A * | 9/1999 | Kimball | 370/328 |
| 6,104,721 A * | 8/2000 | Hsu | 370/431 |
| 6,137,798 A * | 10/2000 | Nishihara et al. | 370/392 |
| 6,411,620 B1 * | 6/2002 | Takase et al. | 370/390 |
| 6,430,183 B1 * | 8/2002 | Satran et al. | 370/389 |
| 6,721,335 B1 * | 4/2004 | Gregg | 370/473 |
| 6,928,076 B2 * | 8/2005 | Mehta et al. | 370/392 |
| 6,963,564 B1 * | 11/2005 | Liu | 370/389 |
| 7,075,935 B1 * | 7/2006 | Humphrey | 370/395.6 |

OTHER PUBLICATIONS

Chen, Thomas M. et al., "ATM Switching Systems," p. 23-25, 113-115 (1995).

Part 3: Carrier sense multiple access with collision detection (CSMA/CD) access method and physical layer specifications, IEEE Std. 802.3, p. 36-40 (1998).

* cited by examiner

UNIFIED DATA PACKET

FIG. 1

FAIRFAX FRAME

FAIRFAX FRAME TRAILER
215

| BIP-8[7:0] | BIT INTERLEAVED PARITY (8-BIT) 501 |

FAIRFAX FRAME TRAILER

UNIFIED DATA PACKET FOR ENCAPSULATING DATA PACKETS HAVING DIVERSE FORMATS

CROSS-REFERENCE TO RELATED APPLICATIONS

This application claims priority under 35 U.S.C. § 119(e) to U.S. Provisional Application No. 60/227,477, filed Aug. 24, 2000, the entirety of which being incorporated herein by reference.

BACKGROUND OF THE INVENTION

The present invention generally relates to packet-based switching systems, and more particularly to methods, apparatuses, mediums, and signals for facilitating the transmission of data packets having diverse formats through switching systems.

DESCRIPTION OF THE RELEVANT ART

A number of different packet-based data transmission protocols are in commercial use. While packet-based switching systems dedicated to particular protocols are common, it has been more difficult to produce general packet switching systems that are able to switch multiple protocols. This is partially due to the diverse formats of the data packets used by the various protocols.

SUMMARY OF THE INVENTION

Embodiments of the present invention described and shown in the specification, claims, and drawings facilitate the transportation of data packets having diverse formats through general packet switching systems.

An object of the present invention is to provide a uniform format for encapsulating the diverse data packet formats generated by various packet-based data transmission protocols. An advantage of the present invention is the improvement in switching efficiency resulting from the use of the particular embodiments of uniform data packet encapsulation formats of the present invention.

In some embodiments of the present invention a frame (also referred in this specification as a "Unified Data Packet") is stored in the computer-readable medium of computer systems, including packet-switching computer systems, or is transported on communications systems between or within computer systems. A particular embodiment of the Unified Data Packet of the present invention is referred to in this specification as the "Fairfax Frame." Embodiments of the Unified Data Packet comprise a Header Section, a Payload Section, and a Trailer Section. The Header Section comprises a Segment Type field and a Final Payload Count Valid field. The contents of the Segment Type field and the contents of the Final Payload Count Valid field are responsive to the contents of the Payload Section. The Header Section may also comprise a Service Type field, a Routing Identification field, and/or a Source Identification field. Embodiments of the Unified Data Packet may further comprise, responsive to the contents of the Final Payload Count Valid field, a Final Payload Count field in the Payload Section. Complete or partial data packets for transport using the Unified Data Packet of the present invention are stored in the Payload Section. Furthermore, the Unified Data Packet of the present invention may comprise two Header Sections, each with an associated Payload section.

Additional objects and advantages of the invention are set forth in part in the description which follows, and in part are obvious from the description, or may be learned by practice of the invention. The objects and advantages of the invention may also be realized and attained by means of the instrumentalities and combinations particularly set out in the appended claims.

BRIEF DESCRIPTION OF THE DRAWINGS

The accompanying drawings, which are incorporated in and constitute part of the specification, illustrate preferred embodiments of the invention, and together with the description, serve to explain the principles of the invention.

In the accompanying drawings.

DETAILED DESCRIPTION

Interpretation of Terms

Unless otherwise noted in this specification or in the claims, all of the terms used in the specification and the claims will have the meanings normally ascribed to these terms by workers in the art. Certain terms specifically comprise the meanings associated with them as follows:

"Computer system" refers to individual standalone computers, multiple computers coupled in any manner, and software simulations of computers regardless of the intended use of the computer system or the technology used to implement the computer system. The term "Computer system" includes, but is not limited to, packet-switching systems and other communications switching systems.

"Data packets" refers to any data packets used by any computer communications protocol, and includes synchronous (including Time Division Multiplex (TDM)) data packets and asynchronous (including High Level Data Link Control (HDLC)) data packets.

Detailed Description

Acts performed by methods and apparatus functions of the present invention may be implemented, as is known in the art, as software running on general purpose computers or special purpose computers, as hardware, or as combinations of software and hardware.

The data packets produced by various computer communications protocols generally vary widely in format, including size. Due to this non-uniformity, it may be difficult and inefficient to switch data packets having diverse formats through a general purpose packet switch. The present invention facilitates such switching by encapsulating all of the data packets to be switched (sometimes referred to as "transported data packet") into a Unified Data Packet format. Embodiments of the Unified Data Packet contain a Header Section, a Payload Section, and a Trailer Section. These embodiments are uniform in overall size, and in the arrangement and purpose of the data fields contained in the Header Section and Trailer Section. The arrangement of the Payload Section, which carries all or a portion of a data packet to be switched, varies, as described below, depending on the data packet being carried. The uniform size of the Unified Data Packet, and the generally uniform arrangement and purpose of the fields within the Unified Data Packet enables Unified Data Packets to be switched efficiently.

Figure 1:
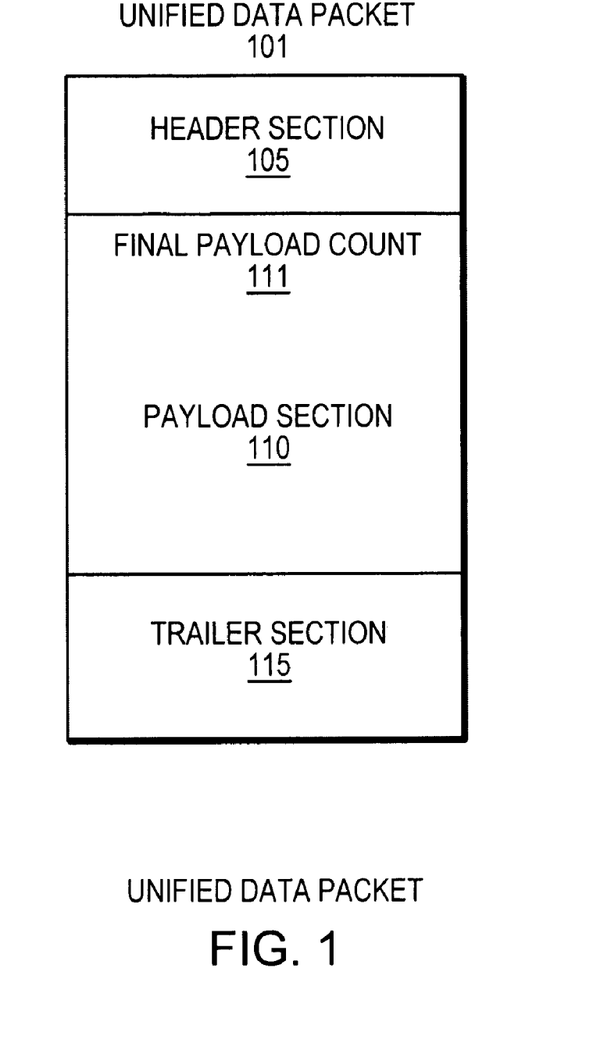
FIG. 1 is a diagram depicting an embodiment of a Unified Data Packet of the present invention for encapsulating data packets having diverse formats.

In the embodiment of Unified Data Packet 101 depicted in FIG. 1, Unified Data Packet 101 comprises Header Section 105, Payload Section 110, and Trailer Section 115. Embodiments of Trailer Section 115 comprise the various fields used for routing and managing data packets and contained in data packet trailers as are known in the art. In some embodiments of the present invention, for example, Trailer Section 115 will contain a single field used in conjunction with error checking, as is known in the art, such as a checksum or a Bit Interleaved Parity value.

In some embodiments, depending on the size of the transported data packet and as described below in connection with the Final Payload Count Valid Field, Payload Section 110 comprises a single, fixed-length field containing all or part of a transported data packet; while in other embodiments Payload Section 110 comprises a fixed-length Final Payload Count field 111 in addition to a fixed-length field containing all or part of a transported data packet.

Embodiments of Header Section 105 comprise the various fields, as are known in the art, for routing and managing data packets. Embodiments of Header Section 105 also comprise fields for indicating Segment Type and Final Payload Count Valid. If a transported data packet is of exactly the same length as fixed-length Payload Section 110, then the Segment Type field is set to indicate that Payload Section 110 contains a complete transported data packet and the Final Payload Count Valid field is set to indicate that Payload Section 110 does not contain a Final Payload Count field 111. If a transported data packet is smaller than the fixed-length Payload Section 110, then the Segment Type field is set to indicate that Payload Section 110 contains a complete transported data packet, the Final Payload Count Valid field is set to indicate that Payload Section 110 contains a Final Payload Count field 111, and the Final Payload Count field 111 contains the length of the transported data packet.

If a transported data packet is larger than the fixed-length Payload Section 110, then the transported data packet must be transported by two or more Unified Data Packets 101. In the Unified Data Packet 101 containing the initial portion of the transported data packet, the Segment Type field is set to indicate that Payload Section 110 contains the initial part of the transported data packet and the Final Payload Count Valid field is set to indicate that Payload Section 110 does not contain a Final Payload Count field 111. In the Unified Data Packet 101 containing a middle part of the transported data packet, the Segment Type field is set to indicate that Payload Section 110 contains a middle part of the transported data packet and the Final Payload Count Valid field is set to indicate that Payload Section 110 does not contain a Final Payload Count field 111. Some embodiments of Header Section 105 will contain a Sequence Number field, as is known in the art. In some embodiments, the Sequence Number field is set to zero in a Unified Data Packet 101 containing a complete or initial part of a transported data packet. The Sequence Number field is incremented by one in each subsequent Unified Data Packet 101 containing a middle part or final part of a transported data packet. Thus, the initial, middle, and final portions of a transported data packet will contain sequential numbers in the Sequence Number fields of the Unified Data Packets 101 carrying the transported data packet and the order of the portions can be determined, as is known in the art, so that the transported data packet portions can be extracted from the Unified Data Packets 101 and correctly reassembled. Other methods of determining the correct order of packets sent through communications systems are known in the art and may be employed.

Finally, in the Unified Data Packet 101 containing the final part of the transported data packet, the Segment Type field is set to indicate that Payload Section 110 contains the final part of the transported data. If the final part of the transported data packet is smaller than the fixed-length Payload Section 110, then the Final Payload Count Valid Field is set to indicate that Payload Section 110 contains a Final Payload Count field 111, and the Final Payload Count field 111 contains the length of the final part of the transported data packet. If the final part of the transported data packet is the same size as the fixed-length Payload Section 110, then the Final Payload Count Valid Field is set to indicate that Payload Section 110 does not contain a Final Payload Count field 111.

A detailed example of one embodiment of the present invention is provided as follows:

Fairfax Frame 201

Figure 2:
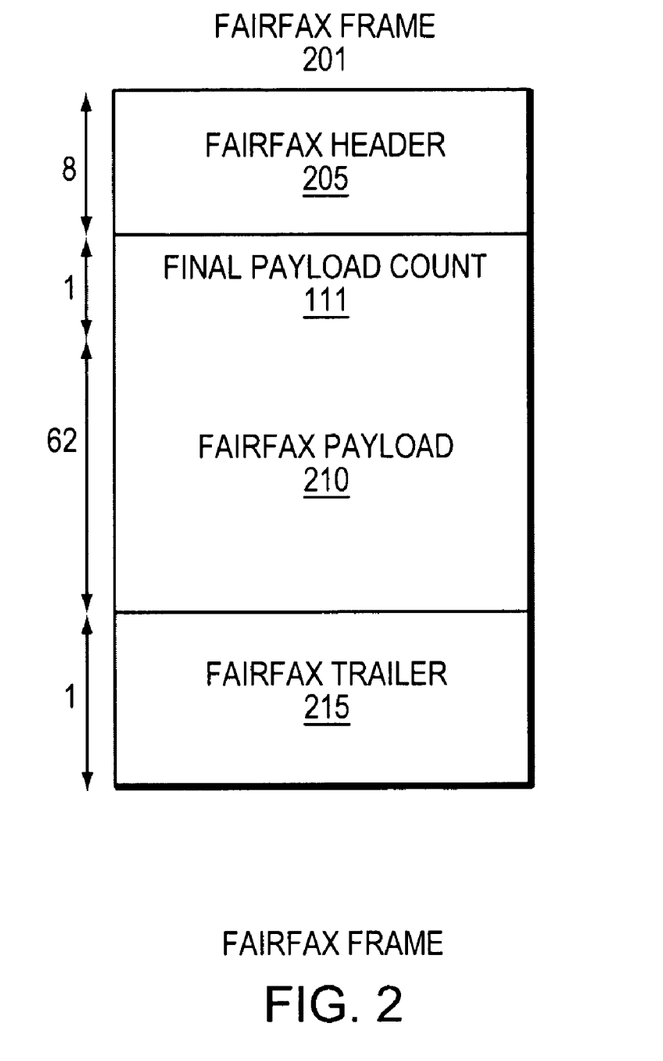
FIG. 2 is a diagram depicting an embodiment of a Fairfax Frame of the present invention.

The Fairfax Frame is the Ocular Networks, Inc., (ONI) Fairfax, Va., proprietary format for encapsulating user Time Division Multiplex (TDM) traffic, Asynchronous Transfer Mode (ATM) Cell or IP packet, configuration information, and Operation, Administration and Maintenance (OA&M) information into a packet to be switched through a packet-based switching fabric. Ocular products using the Fairfax Frame are referred to herein as "Ocular Switching Equipment." An exemplary format for a Fairfax Frame 201 is shown in FIG. 2. Fairfax Frame 201 comprises a Fairfax Header Section 205, which is 8 bytes in size, a Fairfax Payload Section 210, which is 63 bytes in size (including one byte for Final Payload Count field 111), and a Fairfax Trailer Section 215, which is one byte in size.

Fairfax Header Section 205

Figure 3:
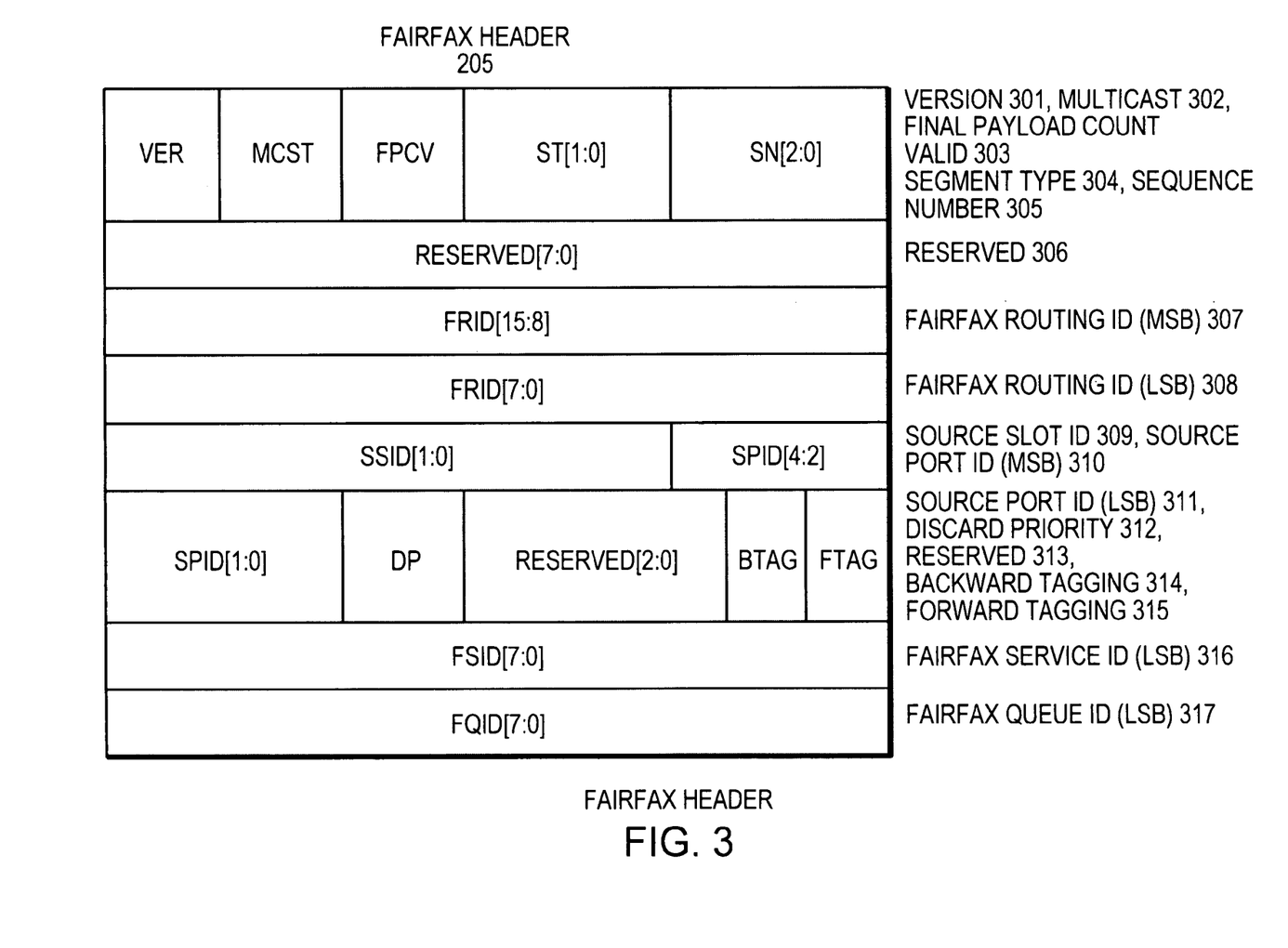
FIG. 3 is a diagram depicting an embodiment of a Header Section of a Fairfax Frame of the present invention.

The header fields are as depicted in FIG. 3 and described in more detail below.

Version 301

Size: 1 bit.

Usage: The Version (VER) field 301 is provided to permit future upgrades to the Fairfax Frame 201 format.

| Value | Description |
|---|---|
| 0 | Version 0—initial value. |
| 1 | Version 1 or higher—future value. |

The field is loaded at every place where Fairfax Frames 201 are generated, and checked at every place where Fairfax Frames 201 are received and interpreted:

All Ocular switching equipment must recognize and interpret a Version 0 frame.

Version 1+ equipment can use the bit to determine the Fairfax Frame 201 capability of the generating equipment.

If Version 0 compatible equipment receives a Version 1+ frame, the frame should be counted and discarded.

The VER field 301 is only one bit because a Version 1+ Fairfax Frame 201 can define additional version bits to accommodate further frame versions.

Unused Values: There are no unused values.

Multicast 302

Size: 1 bit.

Usage: The Multicast (MCST) field 302 indicates whether the frame has a single (unicast) or multiple (multicast) destination(s):

| Value | Description |
|---|---|
| 0 | Frame is unicast, i.e. will be switched to a single egress port. |
| 1 | Frame is multicast, i.e. will be switched to multiple egress ports. |

The MCST field 302 will always be loaded when a Fairfax Frame 201 is created. However, the value may not be used since the frame's destination(s) will be identified by indexing a routing table with the Fairfax Routing ID. The MCST field 302 provides a direct indication of the multicast status for debugging purposes.

Unused Values: There are no unused values.
Segment Type 304
Size: 2 bits.
Usage: The Segment Type (ST) field 304 indicates which part of a user datagram is carried in the Fairfax Payload section 210. The four values are interpreted as follows:

| Value | Description |
|---|---|
| 10 | Beginning Of Frame (BOF) |
| 00 | Continuation Of Frame (COF) |
| 01 | End Of Frame (EOF) |
| 11 | Single Segment Frame (SSF) |

BOF, COF and EOF are applied to Fairfax Frames 201 which carry part of a segmented datagram. SSF is applied to a Fairfax Frame 201 which carries a complete user datagram.

When a segment type error is detected, the erroneous segment should be counted and discarded.

Unused Values: There are no unused values.
Final Payload Count Valid 303
Size: 1 bit.
Usage: The Final Payload Count Valid (FPCV) field 303, together with the header ST field 304 and the first byte of the Fairfax Payload section 210 (known as the Final Payload Count (FPC) 111), indicates the number of valid data bytes in the payload section:

| ST Value | FPCV Value | Description |
|---|---|---|
| BOF | 0 | User datagram information completely fills the Fairfax Payload section 210. |
| | 1 | Invalid, a BOF segment must contain a full payload. When such a frame is detected it should be counted and discarded. |
| COF | 0 | User datagram information completely fills the Fairfax Payload section 210. |
| | 1 | A user datagram error has been detected at the ingress to the network and no further segmentation of the datagram will be performed. |
| EOF | 0 | The end of the user datagram completely fills the entire Fairfax Payload section 210. |
| | 1 | The FPC field 111 contains a count of the number of payload bytes (1-63) which contain the end of the user datagram. |
| SSF | 0 | The user datagram completely fills the entire Fairfax Payload section 210. |

-continued

| ST Value | FPCV Value | Description |
|---|---|---|
| | 1 | The FPC field 111 contains a count of the number of payload bytes (1-63) which contain the entire user datagram. |

The FPCV field 303 prevents the need to add a segment to a datagram just to carry the payload count for a full Fairfax Payload section 210.

This scheme only supports user datagrams which are an integer number of bytes in length.

Unused Values: There are no unused values.
Sequence Number 305
Size: 3 bits.
Usage: The Sequence Number (SN) field 305 provides protection for datagrams segmented into multiple Fairfax Frames 201:

When a user datagram is segmented, the SN field 305 in each consecutive frame is set to an incrementing, modulo 8 number (0-7, 0 . . . ). The SN field 305 will be set to 0 (zero) for the first frame of every datagram.

When a frame carries a complete user datagram, the SN field 305 is set to zero. Any other SN value is invalid.

Some system implementations cannot transmit or receive Fairfax Frames 201 out of order. Therefore an error in the Fairfax Frame SN field 305 indicates a dropped frame. When a Fairfax Frame sequence number error is detected, the erroneous frame should be counted and discarded.

Unused Values: There are no unused values.
Reserved 306
Size: 8 bits.
Usage: The Reserved (RES) field 306 is available to increase the size of the Fairfax Routing Identifier fields 307, 308 and/or include additional control fields in future versions of the Fairfax Frame format. At the time of writing, the field is unused and the value will be set to 00H.

Unused Values: RES values of 01H-FFH are currently invalid. Until the field usage is defined, frames with invalid RES values should be counted but not discarded. The counter should include an enable/disable function so that future versions of the Fairfax Frame 201 can implement a RES field value of 00H without being counted.

Fairfax Header 205 contains an additional reserved field 313. This field is not currently used.

Fairfax Routing Identification 307, 308
Size: 16 bits. As would be understood by one skilled in the art, the Fairfax Routing Identification (FRID) value is located in two fields—FRID field 307 contains the Most Significant Byte (MSB); FRID field 308 contains the Least Significant Byte (LSB).

Usage: The FRID fields 307, 308 identify the frame's path through the Ocular switching equipment between the ingress and egress ports.

Fairfax Routing Identification (FRID) in the Fairfax header provides the logical routing information for transporting the payload from an ingress port to an egress port. Multiple FRIDs can be assigned to one ingress port for establishing multiple connections to several different egress ports.

The FRID is a "virtual" value which represents a unidirectional path through the Ocular switching equipment from an ingress port to an egress port. A bidirectional path through the Ocular switching equipment will have two FRID values assigned, one for each direction.

When the Ocular switching equipment needs to determine the details of the frame's path (e.g. identify the ingress and egress ports) the FRID value will index into routing table(s) which will return the required results, as is known in the art.

The 16-bit FRID fields 307, 308 can identify a maximum of 65,536 unidirectional paths or 32,768 bi-directional paths through the Ocular switching equipment. For TDM ports which encapsulate multiple Digital Signal level 1s (DS1s), there is one FRID assigned to each DS1. This value represents the ingress port, egress port and the location of the DS1 within the encapsulating egress datagram.

Unused values: Frames with unused FRID values will be counted and discarded.

Datagram Reassembly Identification

Together with the First in First Out (FIFO) data transfer mechanism used to pass datagrams through the Ocular switching equipment, the FRID 307, 308, ST 304, and SN 305 fields provide sufficient datagram identification to permit an egress Input Output Board (IOB) to reassemble multiple segmented datagrams from multiple ingress IOBs.

At any one time, an egress IOB can only be reassembling one datagram from each Ocular switching equipment ingress port. The FRID fields 307, 308 identify the source port (and so the original datagram) and the ST 304 and SN 305 fields identify the constituent segments. Note that a multicast datagram may be simultaneously reassembled once on each of multiple egress IOBs.

Source Slot Identification 309

Size: 5 bits.

Usage: The Source Slot Identification (SSID) field 309 identifies the switching system chassis and slot which generated the Fairfax Frame 201.

| Bit | Description |
| --- | --- |
| 4 | Identifies the chassis. A 0 (zero) identifies the first, or only chassis. A 1 (one) identifies the second chassis in a two-chassis installation. |
| 3-0 | Identifies the slot within the chassis. A chassis will hold up to 14 IOBs and two NCBs, with both types of boards capable of generating Fairfax Frames 201. |

The SSID field 309 will always be loaded when a Fairfax Frame 201 is created. However, the value may not be used by any switching system function since the frame's source slot will be identified by indexing a routing table with the FRID 307, 308. The SSID field 309 provides a direct indication of the switching system source slot for debugging purposes.

Unused Values: Since the number of installed chassis, Network Control Boards (NCBs) and IOBs is variable, determination of valid slot values will be configured. Frames with invalid SSID values will be counted and discarded. An NCB provides the control and switching functions to interconnect the traffic between IOBs.

Source Port Identification 310, 311

Size: 5 bits. As would be understood by one skilled in the art, the Source Port Identification (SPID) value is located in two fields—SPID field 310 contains the Most Significant Byte (MSB); SPID field 311 contains the Least Significant Byte (LSB).

Usage: The SPID fields 310 and 311 identify the port that generated the Fairfax Frame 201. The field value is local to each IOB or NCB and starts counting from 0 (zero) for the first port.

For IOB-sourced frames, the lowest numbered SPID values refer to the physical ports on the board. Port number 31 is assigned to test/debug frames generated from the supervisory processor.

All NCB-sourced frames are generated by the supervisory processor and so will be assigned to port number 31.

The SPID fields 310 and 311 will always be loaded when a Fairfax Frame 201 is created. However, the value may not be used by any switching system function since the frame's source port will be identified by indexing a routing table with the FRID. The SPID fields 310 and 311 provide a direct indication of the switching function source port for debugging purposes.

Source Port Identification (SPID) and Source Slot Identification (SSID) provide the information on where the Fairfax frames originated (frame origination location). It can provide information for troubleshooting. For example, SPID, SSID together with Forward Tagging can allow an egress port quickly to identify the source of congestion.

Unused Values: The currently identified IOBs have at most 28 ports (on the DS1 IOB). Therefore SPID values of 28-30 are unused but could be used in the future. All remaining SPID values will be configured based on the type of IOB or NCB. Frames with invalid SPID values will be counted and discarded.

Discard Priority 312

Size: 1 bit.

Usage: The Discard Priority (DP) 312 field is used in congestion situations, where it indicates the discard priority for the frame.

A value of 1 (one) indicates that the frame is discard priority, a value of 0 (zero) indicates that the frame is not discard priority. In a congestion situation, discard priority frames will be discarded in preference to non-discard priority frames.

At an ingress port, any discard priority indication included in the incoming datagrams will be copied into the DP bit 312. At an egress port, the DP bit 312 will be copied into the appropriate datagram field.

The DP bit 312 can be set by the datagram originator, by preceding network elements, or anywhere within the Ocular switching equipment where policing is being performed.

Unused Values: There are no unused values.

Forward Tag 315

Size: 1 bit.

Usage: Forward Tag Congestion Notification or "Forward Tagging" (FTAG) 315 is set to 1 (one) by the Ocular switching equipment to indicate that congestion is being experienced for traffic in the direction of the Fairfax Frame 201 carrying the FTAG 315 indication. Thus, FTAG 315 indicates to the frame destination that congestion was experienced along the frame's path through the Ocular switching equipment.

At an ingress port, any congestion indications included in incoming datagrams are carried transparently through the Ocular switching equipment. The congestion values are not copied to the Fairfax header FTAG field 315. At an egress port, if the Fairfax header FTAG field 315 is set to 1 (one), the value will be copied into the appropriate outgoing datagram field to indicate congestion in the datagram path.

The FTAG bit can be set to 1 (one) anywhere there is policing or queuing within the Ocular switching equipment.

Unused Values: There are no unused values.

Backward Tag Congestion Notification 314

Size: 1 bit.

Usage: Backward Tag Congestion Notification or "Back Tagging" (BTAG) 314 is set to 1 (one) by the Ocular switching equipment to indicate that congestion is being experienced for traffic in the opposite direction of the Fairfax Frame 201 carrying the BTAG 314 indication. Thus, BTAG 314 indicates to the frame source that congestion was experienced for frames being transmitted by the source.

At an ingress port, any congestion indication included in incoming datagrams are carried transparently through the Ocular switching equipment. The congestion values are not copied to the Fairfax header BTAG field 314. At an egress port, if the Fairfax header BTAG field 314 is set to 1 (one), the values will be copied into the appropriate outgoing datagram field to indicate congestion in the datagram path.

The BTAG bit can be set to 1 (one) anywhere there is policing or queuing within the Ocular switching equipment.

BTAG is used within Ocular switching equipment to signal a need to reduce the amount of traffic being passed into the congested function. However, there are a number of issues with BTAG which may result in the field being deleted from the header:

Many protocols do not include a BTAG-type indication in their header/trailer fields. These protocols support sender data rate reduction by transmitting higher-layer protocol messages from the receiver, which receives the forward congestion indication, to the sender.

For those protocols which do support BTAG, the sender is not always required to reduce the transmitted datagram flow.

BTAG does not easily apply to multicast frames because some egress queues/ports may be congested and some may be uncongested.

The BTAG field 314 has been located adjacent to the unused header bits, so that the fields can be merged in the event that BTAG is removed from the Fairfax Header 205.

Unused Values: There are no unused values.

Fairfax Service Identification 316

Size: 8 bits.

Usage: The Fairfax Service Identification (FSID) field 316 identifies the type of datagram, type of service, or owner of the datagram carried in the payload section.

Example datagram and service types are:

TDM DS1

Encapsulating Digital Signal level 0s (DS0s)

Clear channel

TDM Virtual Tributary VT1.5 (VT1.5)

TDM DS3

Encapsulating DS1s

Clear channel

TDM Synchronous Transport Signal level 1 (STS-1) Synchronous Payload Envelope (SPE)

IP Access Concentration

IP encapsulation over Asynchronous Transfer Mode (ATM) Adaptation Layer 5 (AAL5)

ATM Multiplexing

Configuration

Operations Adminstration and Maintenance (OAM)

When the FSID identifies the owner of the payload data, e.g. an Internet Service Provider (ISP), the value represents a complete package of processing and prioritizing to be applied to the payload.

Unused Values: Frames with unused FSID values will be counted and discarded.

Fairfax Queue Identification 317

Size: 8 bits.

Usage: The Fairfax Queue Identification (FQID) field 317 identifies the egress queue/priority for the datagram carried in the payload section.

Example queue/priority types include:

TDM Circuit Assurance

ATM Service Categories

Constant Bit Rate (CBR)

real time Variable Bit Rate (rt-VBR)

non-real time Variable Bit Rate (nrt-VBR)

Unspecified Bit Rate (UBR)

Configuration

OAM

Transmit Last

TDM Circuit Assurance is applied to TDM traffic. Frames with this FQID priority are transmitted to meet the DS1 and DS3 timing requirements through the Ocular switching equipment.

OAM is applied to Ocular switching equipment internal traffic control which may need to be switched even in the event of user datagram congestion.

Configuration is subdivided into at least two sub-priorities, code downloads (lower priority) and routing table updates (higher priority).

Transmit Last is the lowest priority and is only transmitted from an egress queue when no other FQID types are present.

In addition to these queue types, the FQID value assigned at the ingress port may reflect any priority values contained in the incoming datagram.

Unused Values: Frames with unused FQID values will be counted and discarded.

Fairfax Payload Section 210

Figure 4:
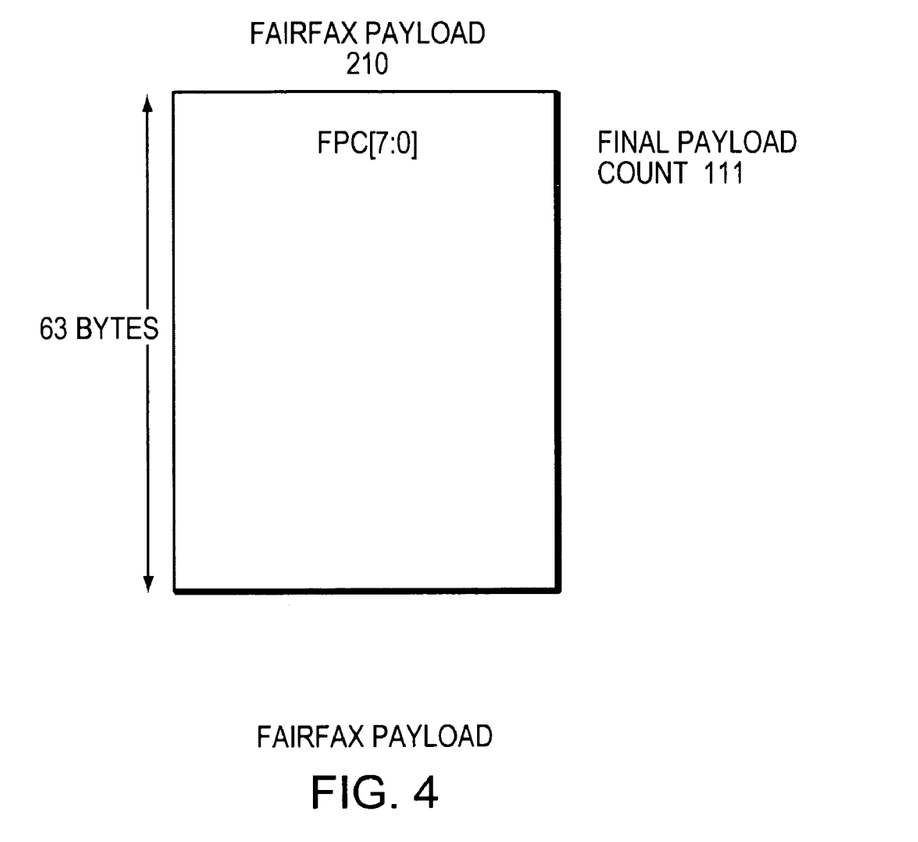
FIG. 4 is a diagram depicting an embodiment of a Payload Section of a Fairfax Frame of the present invention.

The Fairfax Payload Section 210 is depicted in FIG. 4.

Size: 63 bytes.

Usage: The payload section carries the user datagram.

If the datagram to be transferred is no larger than the payload section, the entire datagram is carried in one Fairfax Payload Section 210.

If the datagram to be transferred is larger than the Fairfax Payload Section 210, the datagram will be segmented into multiple subframes. The subframes for a particular datagram may be transferred consecutively or interleaved with segments from other ports and/or IOBs, datagrams from the same port will not be interleaved.) Interleaving between ports is supported to allow ingress IOBs to send data to the associated egress IOB(s) as the data arrives and fills the Fairfax Payload Sections 210, reducing the need to buffer complete datagrams before forwarding them.

Unused Values: If a datagram does not completely fill the payload section, the unused bytes do not have to be set to 0 and can be any value.

Final Payload Count 111

Size: 8 bits.

Usage: The Final Payload Count (FPC) field 111 contains a count of the number of payload bytes which contain user datagram information.

If a datagram does not fill the entire payload section in the last, or only, (sub)frame then the header FPCV field 303 is set to 1 (one) and the first byte of the Fairfax Payload Section 210 becomes the Final Payload Count (FPC) field 111. This field contains a count of the number of payload bytes (1-63) which contain user datagram information.

The unused payload bytes (potentially all but two bytes in the payload section) take up available bandwidth.

If a datagram completely fills the last, or only, (sub)frame then the header FPCV field 303 is set to 0 (zero) and the first byte of the Fairfax Payload Section 210 is a valid datagram byte.

Unused Values: 0 (zero) is unused because this indicates that the previous Fairfax Payload Section 210 was completely filled by the end of the datagram. 64-255 are unused because they indicate more valid datagram bytes than fit in a Fairfax Payload Section 210. For all unused values, the frame will be counted and discarded.

Fairfax Trailer Section 215

Figure 5:
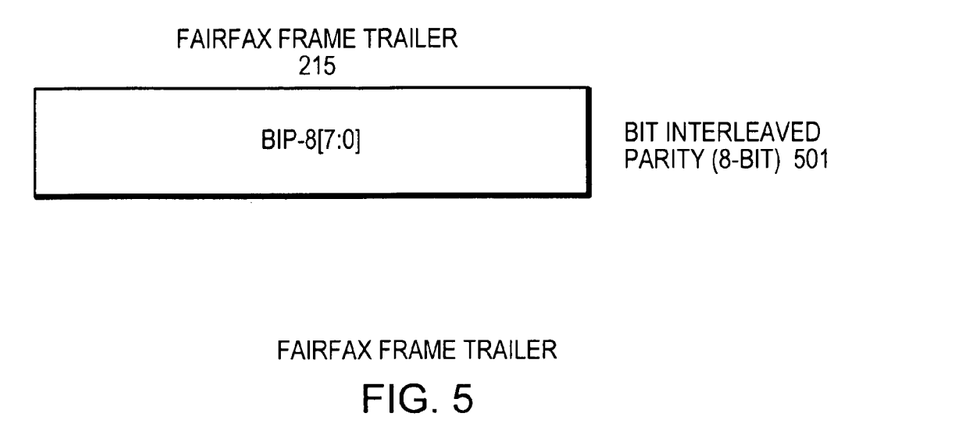
FIG. 5 is a diagram depicting an embodiment of a Trailer Section of a Fairfax Frame of the present invention.

The trailer section comprises a single field as depicted in FIG. 5.

Bit Interleaved Parity (8-bit) 501

Size: 8 bits.

Usage: The Bit Interleaved Parity (8 bit) (BIP-8) field 501 contains the result of taking each frame header and payload byte and performing a parity calculation on each bit position as is known in the art. The BIP-8 value will reflect an odd parity calculation, i.e. the BIP-8 value will be set so the total number of '1' bits in each position is odd.

When a BIP-8 error is detected, the frame will be counted and discarded.

Figure 6:
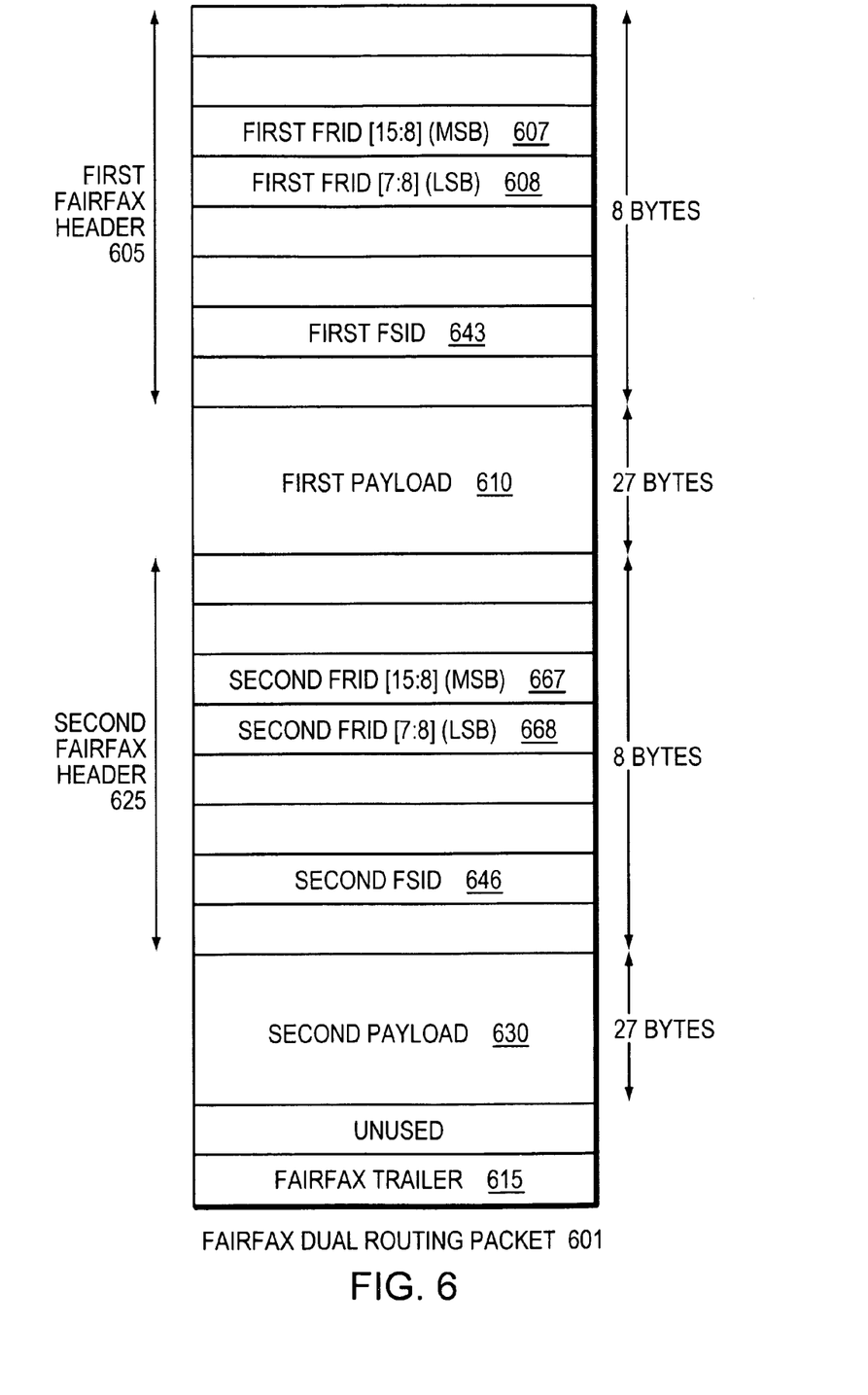
FIG. 6 is a diagram depicting an embodiment of a Fairfax Dual Routing Packet of the present invention.

In another embodiment of the present invention, shown in FIG. 6, a Fairfax Dual Routing Packet 601 is provided. A Fairfax Dual Routing Packet 601 is a packet that carries two Fairfax Routing IDs (FRIDs) with their associated payloads. A First FRID (MSB) 607 and a First FRID (LSB) 608 are associated with a first payload 610. First FRID 607, 608 are part of first Fairfax header 605. A second FRID (MSB) 667 and a second FRID (LSB) 668 are associated with a second payload 630. Second FRID 667, 668 are part of second Fairfax header 625. The original Fairfax payload is divided into two parts: the first part is for First Fairfax Header 605 and First Payload 610, and the second part is for Second Fairfax Header 625 and Second Payload 630. The remaining bytes of the 8-byte First and Second Fairfax Headers 605, 625 are substantially the same as described above for Fairfax Header 205, as shown in FIG. 3. A code in the Service Type field (First FSID 643 and Second FSID 646) of the First and Second Fairfax Headers 605, 625 is used to indicate that the Fairfax packet is a Fairfax Dual Routing Packet.

As an example, the Second Fairfax Header 625 is located starting from the 36th byte as shown in FIG. 6. Because only a single segment frame is carried, no final payload count byte is required. In other words, each Header Section is followed by its Payload Section.

By examining the Service Type field First and Second FSID 643, 646 in Headers 605, 625, the Fairfax packet processor is able to identify each individual routing ID with its associated payload, and to route the two payloads 610 and 630 to separate destinations. In this embodiment, the size of a payload is a predetermined value that is in First and Second FSID 643, 646, such as 27 bytes. In this embodiment, the size of the payload is specified in FSID 643, 646 rather than through FPCV 303. A Fairfax Trailer 615 is used that is the same as Trailer Section 215 depicted in FIG. 5.

CONCLUSION

It should be understood that the preceding is merely a detailed description of some examples and embodiments of this invention and that numerous changes to the disclosed embodiments can be made in accordance with the disclosure herein without departing from the spirit or scope of the invention. The preceding description, therefore, is not meant to limit the scope of the invention.

We claim:

1. A method for transporting data, comprising:
    encapsulating data in a frame, wherein the frame comprises a header section, a payload section, and a trailer section, and wherein the header section comprises a Segment Type field and a Final Payload Count Valid field, and wherein the payload section contains the data;
    setting, responsive to the data, the Segment Type field and the Final Payload Count Valid field, the Final Payload Count Valid field indicating whether or not the payload section includes a Final Payload Count field, the Final Payload Count field indicating an amount of data placed in the payload section;
    transporting the frame through a communication system; and
    extracting from the transported frame, responsive to the Segment Type field and the Final Payload Count Valid field, the data from the payload section.

2. The method for transporting data of claim 1, wherein the contents of the payload section comprise, responsive to the Final Payload Count Valid field, the Final Payload Count field, and wherein extracting the data from the payload section is further responsive to the Final Payload Count field.

3. An apparatus for transporting data, comprising:
    a packet switch operable to encapsulate data in a frame, wherein the frame comprises a header section, a payload section, and a trailer section, and wherein the header section comprises a Segment Type field and a Final Payload Count Valid field, and wherein the payload section contains the data;
    the packet switch operable to set, responsive to the data, the Segment Type field and the Final Payload Count Valid field, the Final Payload Count Valid field indicating whether or not the payload section includes a Final Payload Count field, the Final Payload Count field indicating an amount of data placed in the payload section;
    the packet switch operable to transport the frame through a communication system; and
    the packet switch operable to extract from the transported frame, responsive to the Segment Type field and the Final Payload Count Valid field, the data from the payload section.

4. The apparatus for transporting data of claim 3, wherein the contents of the payload section comprise, responsive to the Final Payload Count Valid field, the Final Payload Count field, and wherein extracting the data from the payload section is further responsive to the Final Payload Count field.

5. A computer-readable storage medium for organizing data for transport, the computer readable medium encoding a data structure comprising:
    a frame comprising a header section, a payload section, and a trailer section;
    wherein the header section comprises a Segment Type field and a Final Payload Count Valid field, and wherein the contents of the Segment Type field and the contents of the Final Payload Count Valid field are responsive to the contents of the payload section, the Final Payload Count Valid field indicating whether or not the payload section includes a Final Payload Count field, the Final Payload Count field indicating an amount of data placed in the payload section.

6. The computer-readable storage medium for organizing data for transport of claim 5, wherein the contents of the payload section comprise, responsive to the Final Payload Count Valid field, the Final Payload Count field.

7. A transmission system, comprising:
    a packet switch operable to generate a frame for transporting data packets in diverse formats, said frame comprising a header section, a payload section, and a trailer section; and
    wherein the header section comprises a Segment Type field and a Final Payload Count Valid field, and wherein the contents of the Segment Type field and the contents of the Final Payload Count Valid field are responsive to the contents of the payload section, the Final Payload Count Valid field indicating whether or not the payload section includes a Final Payload Count field, the Final Payload Count field indicating an amount of data placed in the payload section.

8. The transmission system of claim 7, wherein the contents of the payload section comprise, responsive to the Final Payload Count Valid field, the Final Payload Count field.

9. The method of transporting data of claim 1, wherein the frame comprises a first header section and a first payload section associated with the first header section, a second header section and a second payload section associated with the second header section, and a trailer section, and wherein the first header section comprises a First Service Type field and the second header section comprises a Second Service Type field, and wherein the first payload section contains a first portion of the data and the second payload section contains a second portion of the data, wherein the first and second payload sections carry data having different service types as identified by the First and Second Service Type fields;

the method further comprising:
  setting, responsive to the first portion of the data, the First Service Type field;
  setting, responsive to the second portion of the data, the Second Service Type field;
  extracting from the transported frame, responsive to the First Service Type field, the first portion of the data from the first payload section; and
  extracting from the transported frame, responsive to the Second Service Type field, the second portion of the data from the second payload section.

10. The apparatus for transporting data of claim 3, wherein the frame comprises a first header section and a first payload section associated with the first header section, a second header section and a second payload section associated with the second header section, and a trailer section, and wherein the first header section comprises a First Service Type field, and the second header section comprises a Second Service Type Field, and wherein the first payload section contains a first portion of the data, and the second payload section contains a second portion of the data, wherein the first and second payload sections carry data having different service types as identified by the First and Second Service Type fields;

the packet switch operable to:
  set, responsive to the first portion of the data, the First Service Type field;
  set, responsive to the second portion of the data, the Second Service Type field;
  extract from the transported frame, responsive to the First Service Type field, the first portion of the data from the first payload section; and
  extract from the transported frame, responsive to the Second Service Type field, the second portion of the data from the second payload section.

11. The computer readable storage medium for organizing data for transport of claim 5, wherein the frame comprises a first header section and a first payload section associated with the first header section, a second header section and a second payload section associated with the second header section, and a trailer section; and
  wherein the first header section comprises a First Service Type field and the second header section comprises a Second Service Type field, the contents of the First Service Type field being responsive to the contents of the first payload section, and the contents of the Second Service Type field being responsive to the contents of the second payload section, the first and second payload sections carrying data having different service types as identified by the First and Second Service Type fields.

12. The transmission system of claim 7, wherein the frame comprises a first header section and a first payload section associated with the first header section, a second header section and a second payload section associated with the second header section, and a trailer section; and
  wherein the first header section comprises a First Service Type field and the second header section comprises a Second Service Type field, the contents of the First Service Type field being responsive to the contents of the first payload section and the contents of the Second Service Type field being responsive to the contents of the second payload section, the first and second payload sections carrying data having different service types as identified by the First and Second Service Type fields.

13. The method for transporting data of claim 1, wherein the Segment Type field indicates that the data is carried over multiple frames.

14. The apparatus for transporting data of claim 3, wherein the Segment Type field indicates that the data is carried over multiple frames.

15. The computer-readable storage medium for organizing data for transport of claim 5, wherein the Segment Type field indicates that the data is carried over multiple frames.

16. The transmission system of claim 7, wherein the Segment Type field indicates that the data is carried over multiple frames.

17. The method for transporting data of claim 1, wherein the payload section includes the Final Payload Count field in response to the Segment Type field and the Final Payload Count Valid field indicating that the encapsulated data does not require the entire payload section for transport, the payload section not including the Final Payload Count field in response to the Segment Type field and the Final Payload Count Valid field indicating that the encapsulated data requires the entire payload section for transport.

18. The apparatus for transporting data of claim 3, wherein the payload section includes the Final Payload Count field in response to the Segment Type field and the Final Payload Count Valid field indicating that the encapsulated data does not require the entire payload section for transport, the payload section not including the Final Payload Count field in response to the Segment Type field and the Final Payload Count Valid field indicating that the encapsulated data requires the entire payload section for transport.

19. The computer-readable storage medium for organizing data for transport of claim 5, wherein the payload section includes the Final Payload Count field in response to the Segment Type field and the Final Payload Count Valid field indicating that the encapsulated data does not require the entire payload section for transport, the payload section not including the Final Payload Count field in response to the Segment Type field and the Final Payload Count Valid field indicating that the encapsulated data requires the entire payload section for transport.

20. The transmission system of claim 7, wherein the payload section includes the Final Payload Count field in response to the Segment Type field and the Final Payload Count Valid field indicating that the encapsulated data does not require the entire payload section for transport, the payload section not including the Final Payload Count field in response to the Segment Type field and the Final Payload Count Valid field indicating that the encapsulated data requires the entire payload section for transport.

* * * * *